United States Patent [19]

Lee

[11] Patent Number: 5,099,400
[45] Date of Patent: Mar. 24, 1992

[54] HEADLIGHT MOVING APPARATUS FOR A MOTOR VEHICLE

[76] Inventor: Hyun J. Lee, 635-13 Shinam-Dong, Dong-Ku, Daegu, Rep. of Korea

[21] Appl. No.: 622,643

[22] Filed: Dec. 5, 1990

[51] Int. Cl.$^5$ ............................................. B60Q 1/064
[52] U.S. Cl. ....................................... 362/37; 362/53; 362/40; 362/71
[58] Field of Search ................... 362/61, 80, 37, 40, 362/53, 69, 71, 43, 49, 54; 315/82

[56] References Cited

U.S. PATENT DOCUMENTS

| | | | |
|---|---|---|---|
| 3,207,891 | 9/1965 | Eberle | 362/71 |
| 4,340,928 | 7/1982 | Hohmann, Jr. | 362/49 |
| 4,482,939 | 11/1984 | Tishman | 362/419 |
| 4,733,333 | 3/1988 | Shibata et al. | 362/40 |
| 4,870,545 | 9/1989 | Hatanaka et al. | 315/82 |
| 4,908,560 | 3/1990 | Shibata et al. | 362/71 |
| 4,943,893 | 7/1990 | Shibata et al. | 362/37 |

FOREIGN PATENT DOCUMENTS

| | | | |
|---|---|---|---|
| 0129519 | 12/1984 | European Pat. Off. | 362/69 |
| 2600747 | 7/1976 | Fed. Rep. of Germany | 362/54 |
| 52-83146 | 6/1977 | Japan . | |
| 0186546 | 11/1982 | Japan | 362/37 |
| 0207243 | 9/1986 | Japan | 362/37 |
| 15426 | of 1914 | United Kingdom | 362/49 |

Primary Examiner—Ira S. Lazarus
Assistant Examiner—D. M. Cox
Attorney, Agent, or Firm—Birch, Stewart, Kolasch & Birch

[57] ABSTRACT

A headlight moving apparatus which includes a steering wheel angle detecting member, a headlight angle detecting member, and an actuating member operatively associated with the steering wheel and headlight angle detecting members, whereby the headlights swing right and left on the basis of the angular position of the steering wheel.

4 Claims, 9 Drawing Sheets

HEADLIGHT MOVING APPARATUS FOR A MOTOR VEHICLE

BACKGROUND OF THE INVENTION

1. Field of the Invention

The present invention relates to a headlight moving apparatus for a motor vehicle and more particularly, to an improved headlight moving apparatus for adjustably swinging the headlights for the motor vehicle according to the turning direction of the vehicle through a steering wheel angle detecting sensor so that the headlights can brighten the forward road surface, in particular, when the vehicle runs along a curved road.

2. Description of the Prior Art

In general, conventional headlights are fixedly mounted on the front ends of a vehicle body. As for as the vehicle is running along a straight road, the headlights can brighten the forward road surface through a low beam or a high beam and no problem arises. However, the vehicle is running along a curved road, the headlights cannot appropriately brighten the forward road surface.

To avoid this problem, there has been proposed an apparatus which can swing the headlights right and left on the basis of angular positions of the steering wheel through a wire connected to a pitman arm and the headlights as described in Japanese patent Laid-Open No. SO52-83,146. However, this apparatus does not disclose the use of a system which directly detects the vehicle curve running direction so that the headlights can swing later after the vehicle runs along the curved road. Furthermore, it is very difficult for the swing of the headlights to perfectly align the angular position of the steering wheel.

SUMMARY OF THE INVENTION

Accordingly, it is an object of the present invention to provide a headlight moving apparatus to adjustably swing the headlights for the motor vehicle according to the turning direction of the vehicle so that the headlights can brighten the forward road surface when the vehicle runs along a curved road.

Another object of the present invention relates to a headlight moving apparatus for a motor vehicle which includes a steering wheel angle detecting sensor for converting the angular position of the steering wheel to an electric signal, an actuating member operated by the electric signal to drive to the headlights, and a headlight angle detecting sensor for stopping the actuating member whereby the headlights swing right and left on the basis of the angular position of the steering wheel.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly describe, the present invention relates to a headlight moving apparatus which includes a steering wheel angle detecting member, a headlight angle detecting member, and an actuating member operatively associated with the steering wheel and headlight angle detecting members, whereby the headlights swing right and left on the basis of the angular position of the steering wheel.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
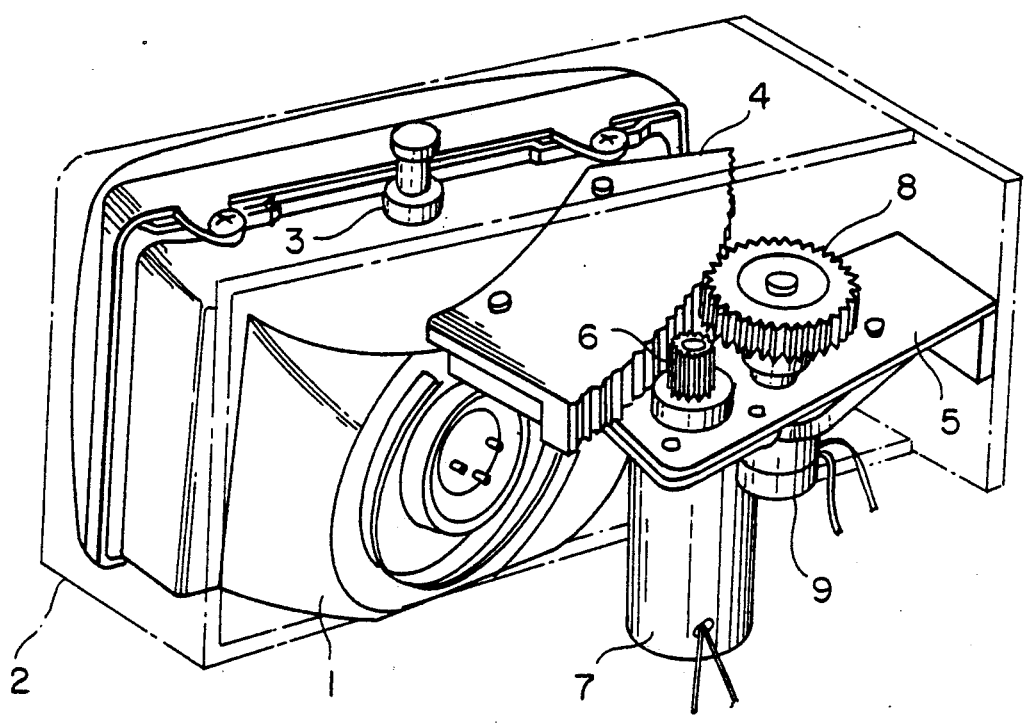
FIG. 1 is a perspective view of the headlight moving apparatus according to the present invention containing cut away portions in order to illustrate the basic construction thereof.
Figure 2:
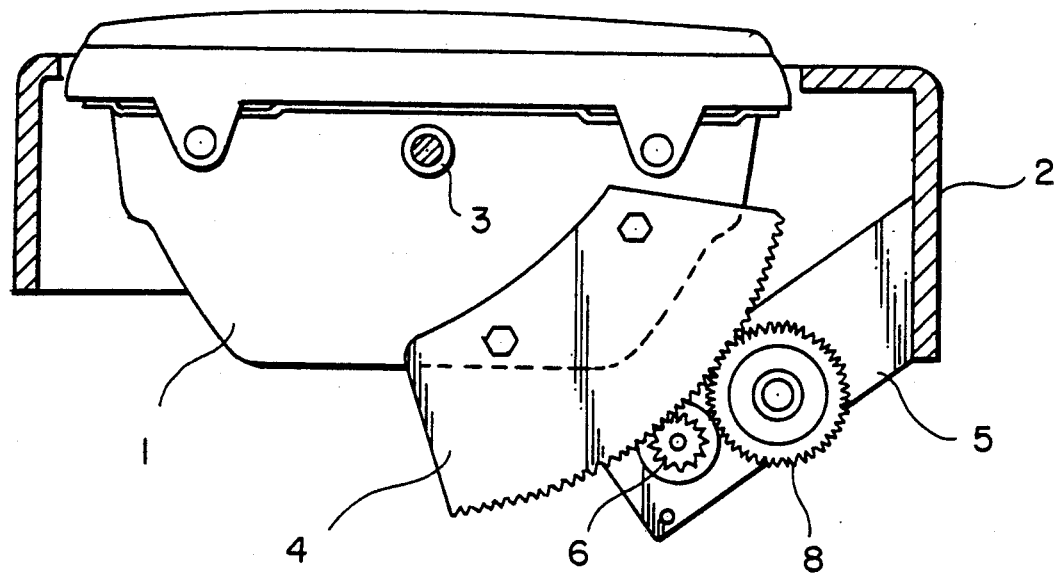
FIG. 2 is a cross-sectional view of FIG. 1.
Figure 3:
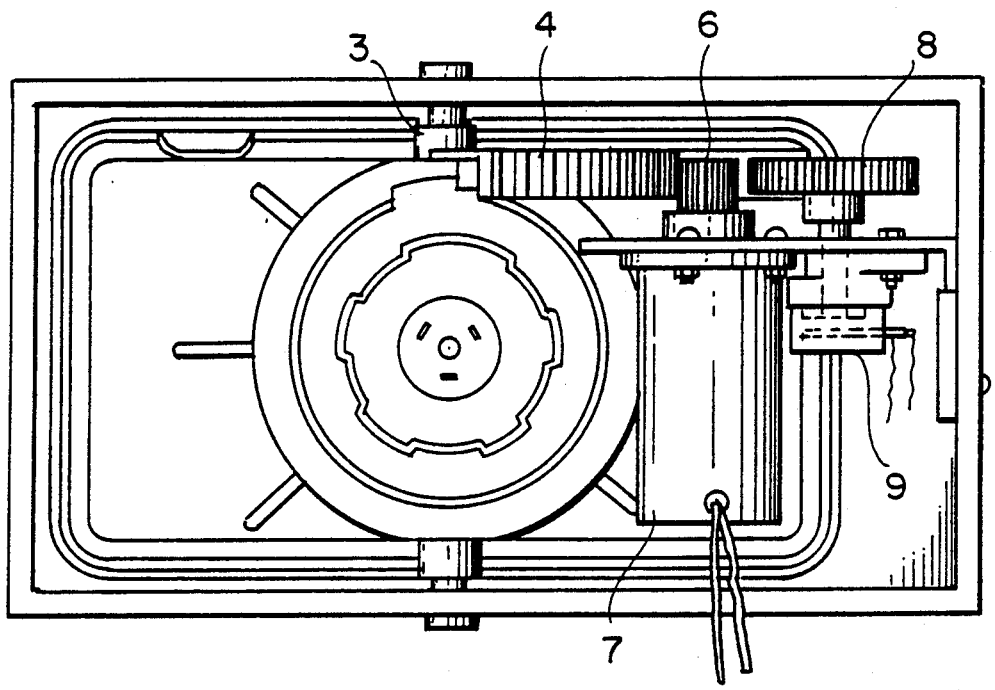
FIG. 3 is a sectional view of FIG. 1.
Figure 4:
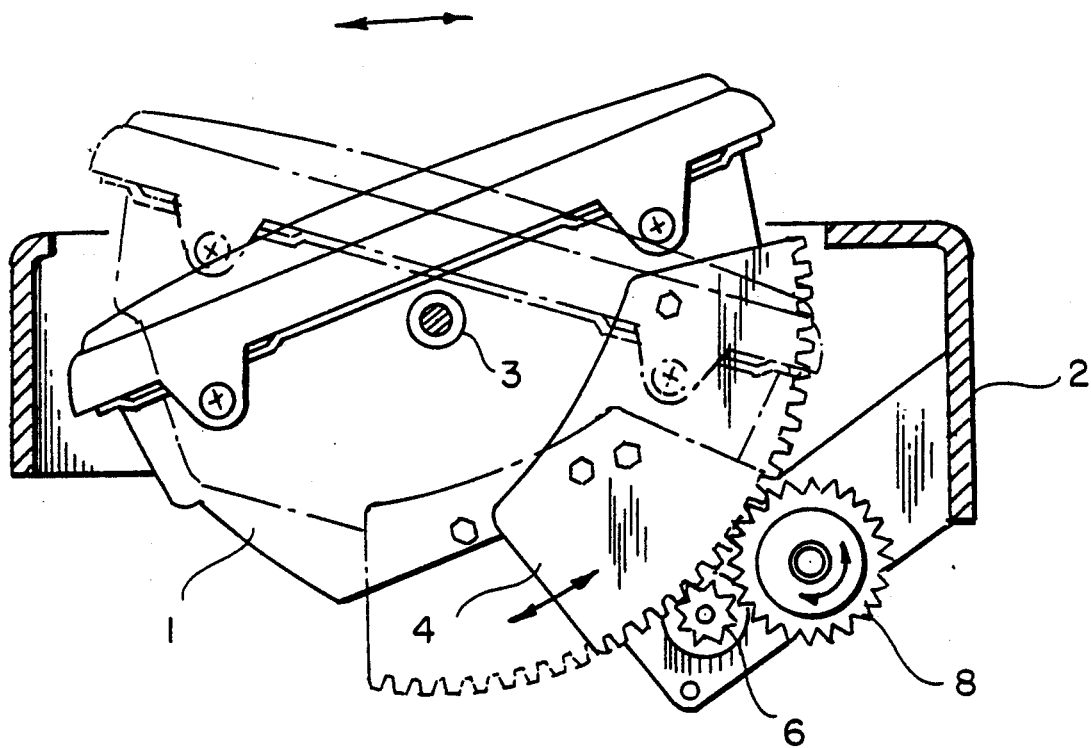
FIG. 4 is an enlarged cross-sectional view of FIG. 1 showing its opening.

Referring now in detail to the drawings for the purpose of illustrating preferred embodiments of the present invention, the headlight moving apparatus for a motor vehicle as shown in FIGS. 1, 2, 3, and 4, comprises at least one headlight 1 disposed in a casing 2, a headlight shaft 3 of the headlight 1, and an actuating member including a mid-gear mounted to the headlight 1 through a pitch surface of the mid-gear, a servo-motor 7, two-way motor, having a motor gear 6 extending from a motor shaft of the servo-motor 7, and a headlight angle detecting sensor 9 having a headlight sensor gear 8 extending from a headlight sensor shaft. A supporting plate 5 is mounted to one side wall of the interior of the casing 2. The mid-gear 4 is disposed in gearing relationship with the motor gear 6 and the sensor gear 8.

Figure 5:
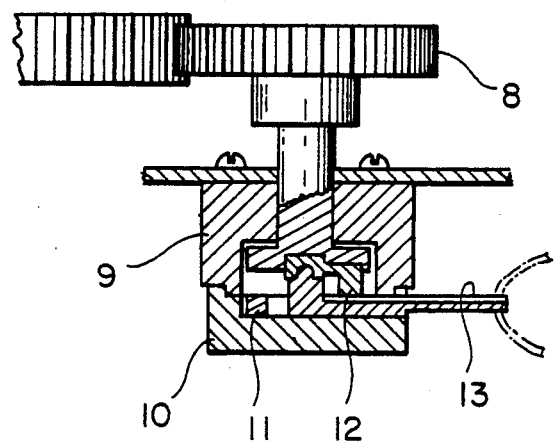
FIG. 5 is a sectional view of a steering wheel angle detecting sensor of the headlight moving apparatus according to the present invention.
Figure 6:
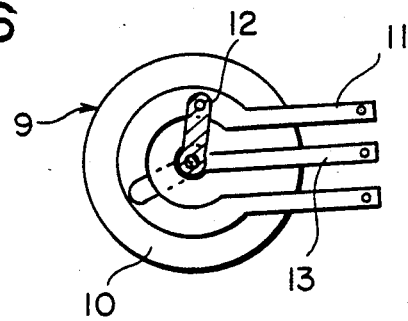
FIG. 6 is a cross-sectional view of FIG. 5.
Figure 7:
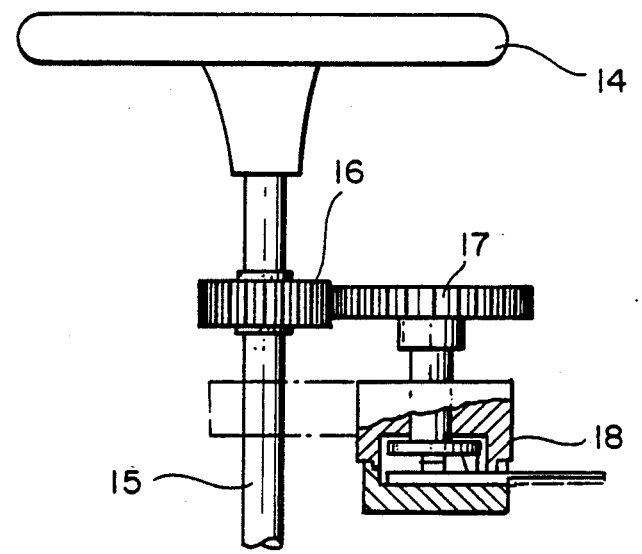
FIG. 7 is a sectional view of the sensor attached to a steering wheel according to the present invention.

As shown in FIGS. 5, 6, and 7, the sensor 9 includes a circular plate 10, a ring-shaped rotatable, variable resistor 11 disposed on the circular plate 10, a rotatable contacting point 12 picked up on the surface of the variable resistor 11, and a mid-terminal 13 disposed within the ring-shaped variable resistor 11, whereby the angular position of the headlight 1 is detected by detecting the output voltage of the mid-terminal 13 when the voltage is started to both ends of the variable resistor 11.

As shown in FIG. 7, a steering wheel 14 is provided with a steering wheel gear 16 mounted to the lower portion of a steering wheel shaft 15 thereof, a steering wheel sensor gear 17 extending from a steering wheel sensor shaft, and a steering wheel angle detecting sensor 18 mounted to the steering wheel sensor shaft for detecting the angular position of the steering wheel 14 through the rotatable contacting point 12 thereof. The steering wheel gear 16 and the steering wheel sensor gear 17 are disposed in gearing relationship with each other.

Figure 8:
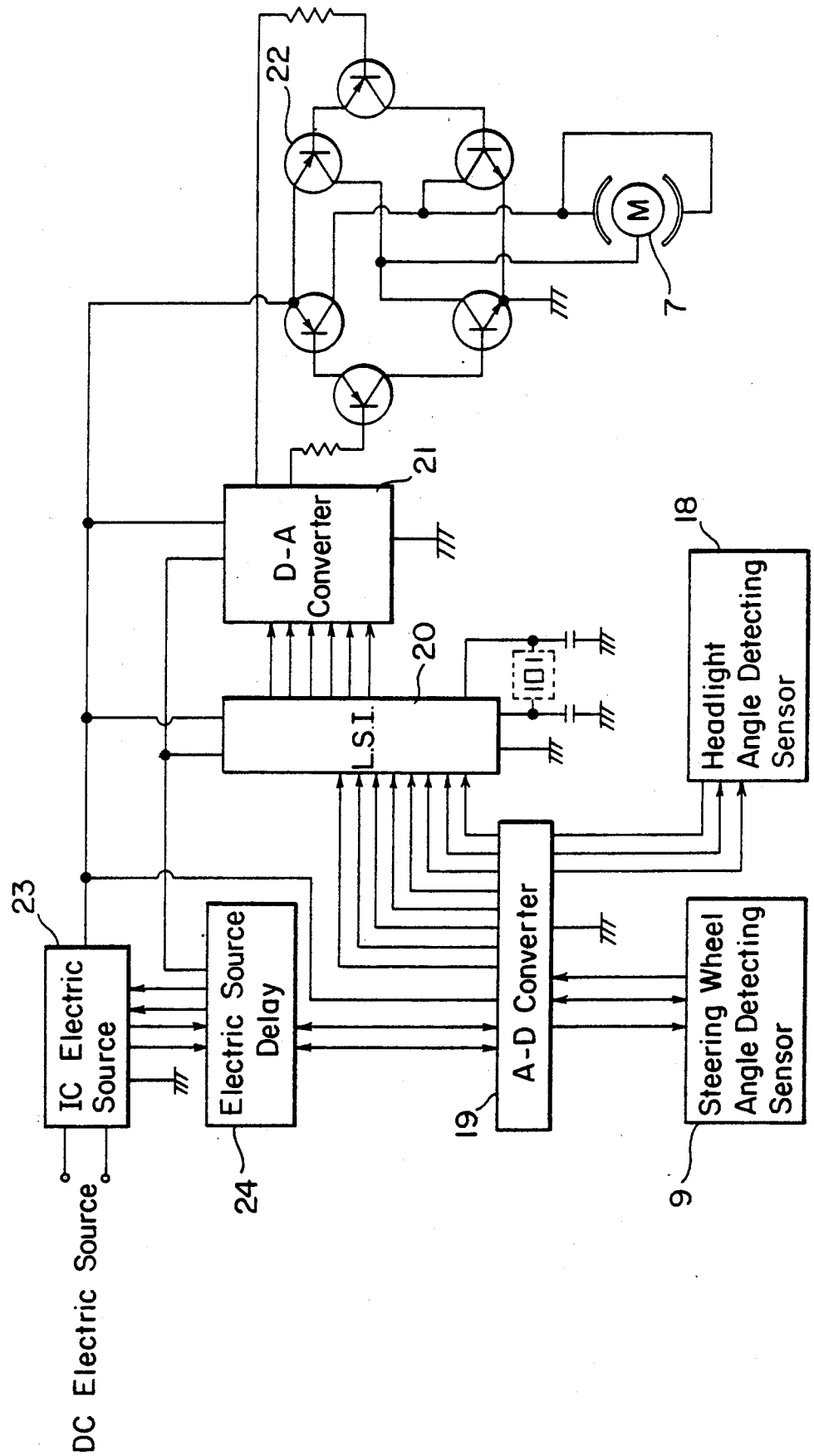
FIG. 8 shows a circuit of the headlight moving apparatus of the present invention.

As shown in FIG. 8, an A/D converter 19 converts the output voltage of the headlight angle detecting sensor 9 and the steering wheel angle detecting sensor 18 to a digital signal and transmits it to an LSI 20. The LSI 20 controls the digital signal and transmits an output signal for use in driving of the servo-motor 7. A D/A converter 21 converts the output signal to an analog signal and makes actuate a plurality of transistors 22 and drive the sub-motor 7. A reference numeral 23 is an IC electric source and a reference numeral 24 is an electric source delay.

In the operation, when the steering wheel 14 is positioned on the normal position, that is, the steering wheel 14 does not turn, at least one headlight 1 mounted near both the front end sides of the vehicle brightens the forward road surface, and the standard voltage offers an output to the headlight angle detecting sensor 9 and the steering wheel angle detecting sensor 18, the steering wheel 14 is turned to right or left by the hands. At this time, the steering wheel gear 16 is rotated by the steering wheel shaft 15, which is geared with the steering wheel sensor gear 17 so as to change the output voltage of the steering wheel angle detecting sensor 18 to the digital signal by the A/D convertor 19, which transmits the digital signal to the LSI 20. The LSI 20 transmits the motor driving signal to the D/A converter 21 to make actuate the transistors 22 and drive the sub-motor 7 to right or left. Upon rotating to right or left of the servo-motor 7, the motor gear 6 rotates to right or left so that at least one headlight 1 are driven to right or left by the mid-gear 14 geared with the motor gear 6.

At that time, the headlight sensor shaft of the headlight angle detecting sensor 9 is rotated to right or left since the headlight sensor 8 is geared with the mid-gear 4 so that the headlight sensor 9 transmits the corresponding output voltage according to the angular position of the headlight 1. The A/D convert 19 transmits the digital signal from the output voltage to the LSI 20. The LSI 20 transmits the motor driving signal to the D/A convertor 21 to make actuate the transistors 22 and drive the sub-motor so as to stop the servo-motor finally. Thus, at least one headlight 1 can brighten very fast the forward surface road when the vehicle runs along a curved road. Also, the headlight moving apparatus of the present invention is very simple to construct and easy in operation.

Figure 9:
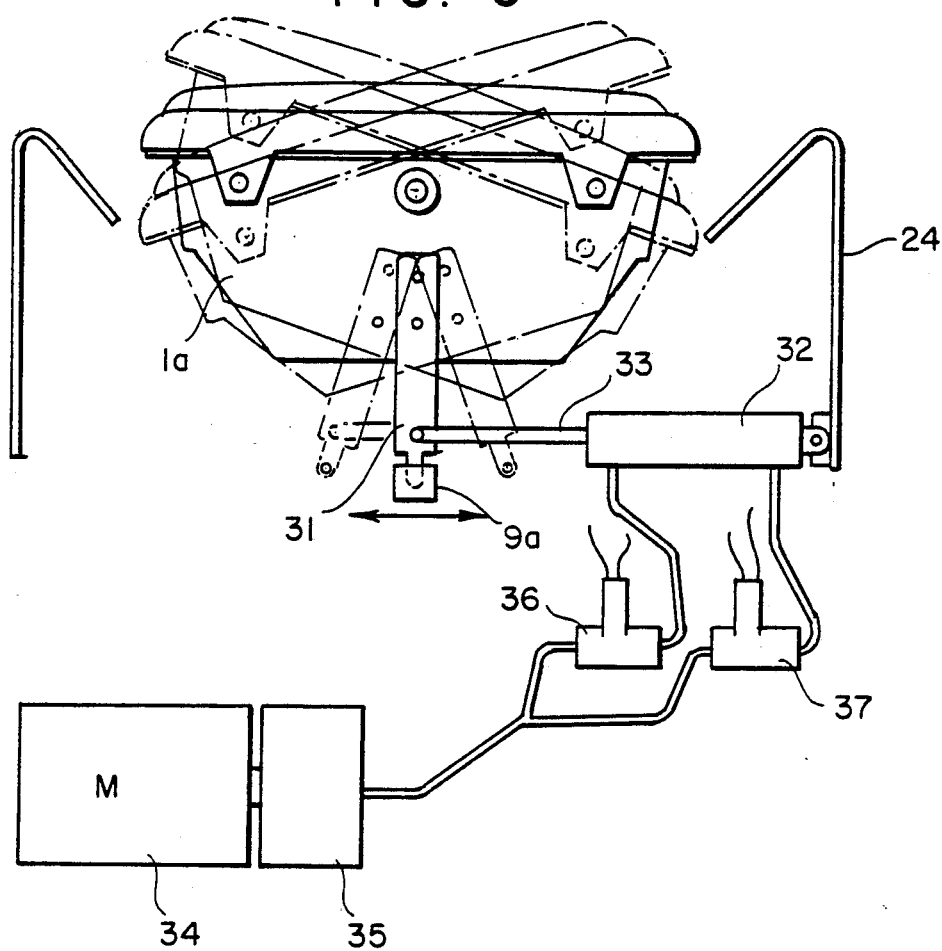
FIG. 9 diagrammatically shows the second embodiment of a mechanical system of the headlight moving apparatus of the present invention.

FIGS. 9 to 12 shows the second embodiments of the headlight moving apparatus according to the present invention. At least one headlight 1a disposed in a casing 2a includes an actuator 31 mounted thereto at one end thereof and connected to a piston rod 33 of an oil pressure cylinder 32 at the other end thereof. The oil pressure cylinder 32 is mounted to the casing 2a. The actuator 31 has a point end thereof. A headlight angle detecting light sensor 9a is located at the point end of the actuator 31 for detecting the standard position of the headlight 1a by reflecting and shutting out the light. The oil pressure cylinder 32 is operated by a pair of solenoid valves 36 and 37 through the oil supplied by an oil pump 35 actuated by a motor 34 (FIG. 9). The motor 34 and solenoid valves 36 and 37 are driven by an LSI 20a operatively associated with a D/A convertor 21a and transistors 22a. A reference numeral 39 is a sensor switch.

Figure 10:
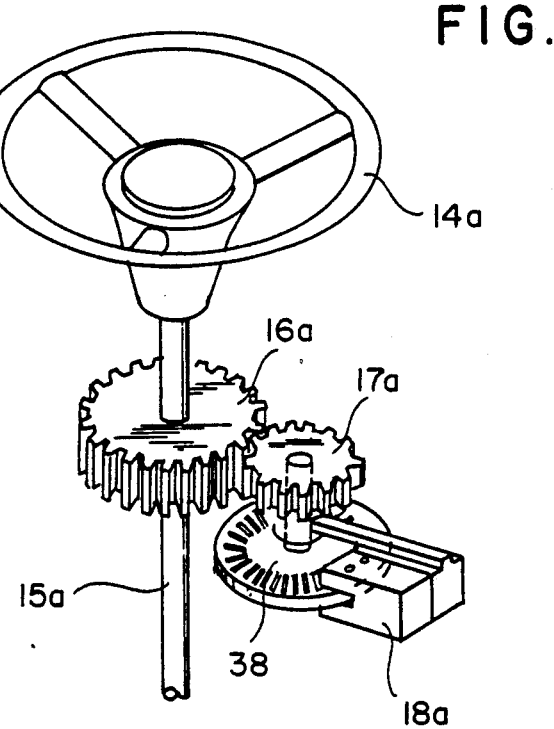
FIG. 10 is a perspective view of the second embodiment of the sensor attached to a steering wheel of the present invention.
Figure 11:
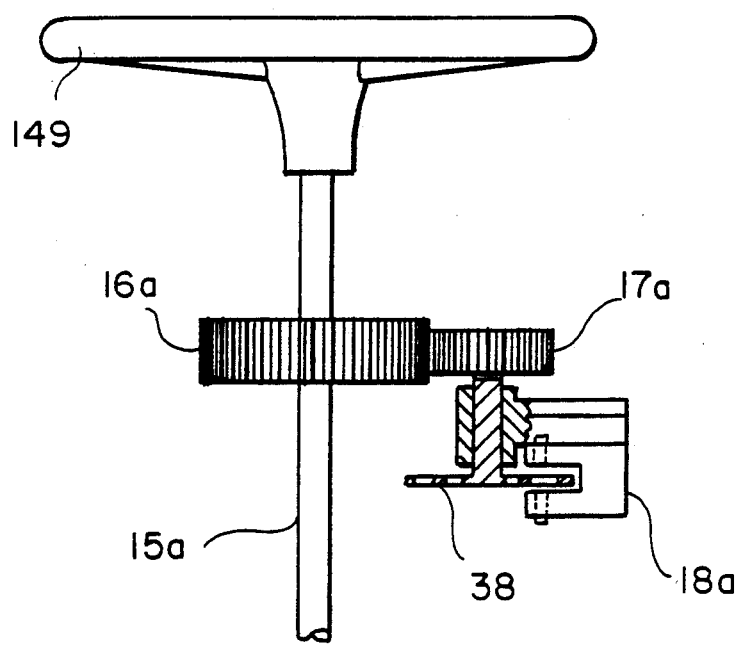
FIG. 11 of a sectional view of FIG. 10.

As shown in FIG. 10, a steering wheel 14a is provided with a steering wheel gear 16a mounted to the lower portion of a steering wheel shaft 15a thereof, a steering wheel sensor gear 17a extending from a steering wheel sensor shaft connected to an aperture plate 38 having a plurality of small apertures, and a steering wheel angle detecting sensor 18a mounted to the steering wheel sensor shaft. The aperture plate 38 passes through a groove of the steering wheel angle detecting light sensor 18a wherein plurality of small apertures of the sensor 18a mates with the plurality of small apertures of the aperture plate 38 for detecting the alignment of both small apertures of the sensor 18a and the aperture plate 38 so as to transmit the signal.

In operation, when the steering wheel 14a is turned, the aperture plate 38 is rotated by both gears 16a and 17a. At this time, the steering wheel angle detecting light sensor detects the angular position of the steering wheel 14a and transmits a corresponding signal to an LSI 20a. The LSI 20 transmits the signal to the D/A converter 21a to make actuate the motor 34 and one of solenoid valves 36 and 37. Therefore, the piston rod 33 moves forward and backward to rotate the headlight 1a in response to the angular position of the steering wheel 14a.

Also, when the steering wheel 14 is returned to the standard position, the output of the headlight angle detecting sensor 9a is zero and at that time, at least one headlight 1 is returned to the standard position by operating the oil pressure cylinder 32. That is, when the end of the actuator 31 is inserted into the sensor 9a, the output signal from the sensor 9a transmits to the LSI 20a to close the pair of solenoid valves 36 and 37 and the piston rod 33. Thus, the headlight 1 can brighten the forward road surface.

Figure 13:
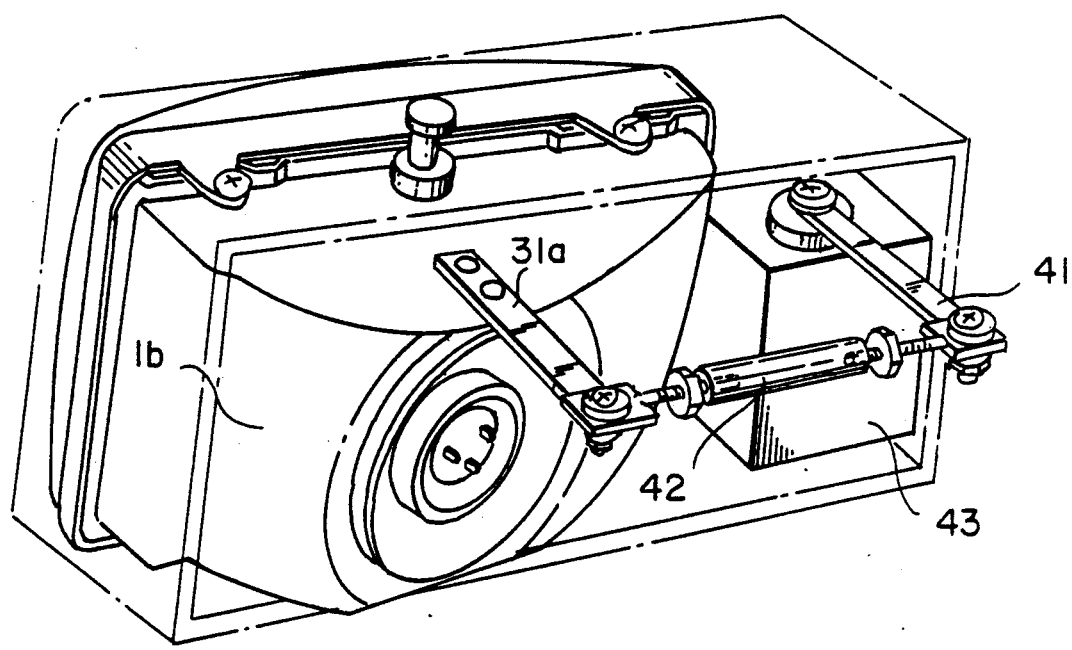
FIG. 13 is a perspective view of the third embodiment of the headlight moving apparatus of the present invention containing cut away portions in order to illustrate the basic construction thereof.
Figure 12:
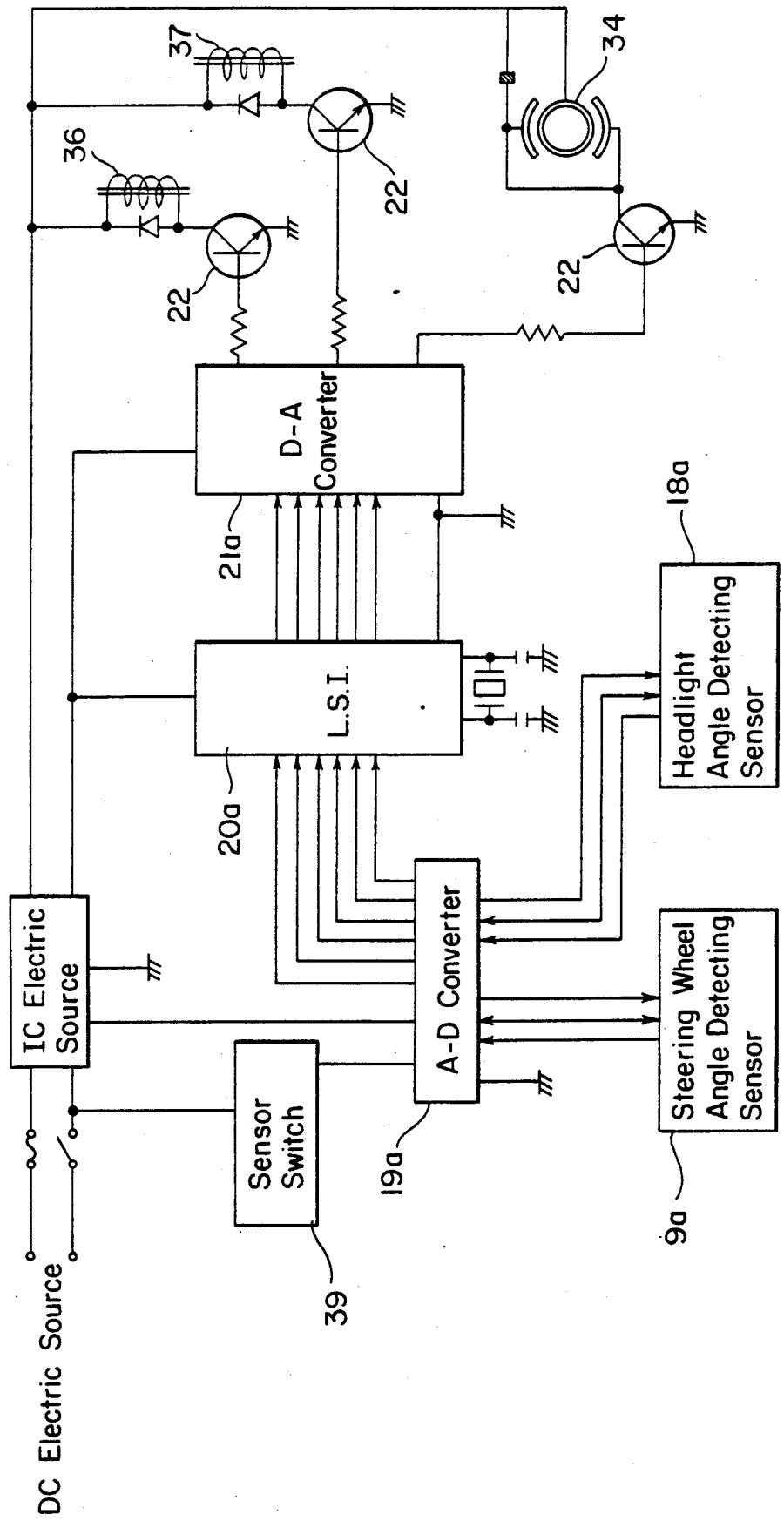
FIG. 12 shows a circuit of the headlight moving apparatus of the second embodiment of the present invention.
Figure 14:
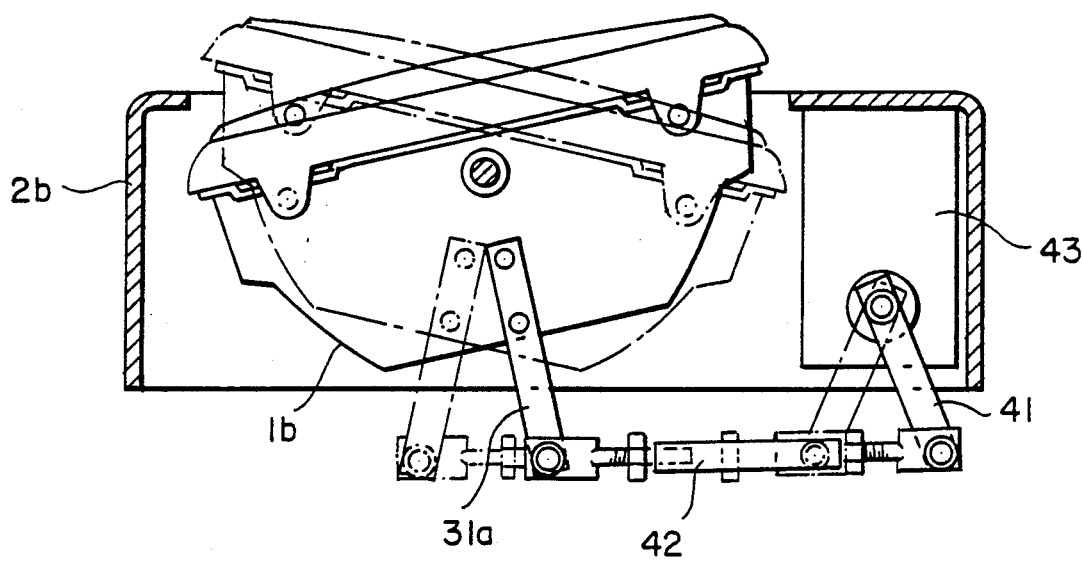
FIG. 14 is a cross-sectional view of FIG. 14 showing its operation.
Figure 15:
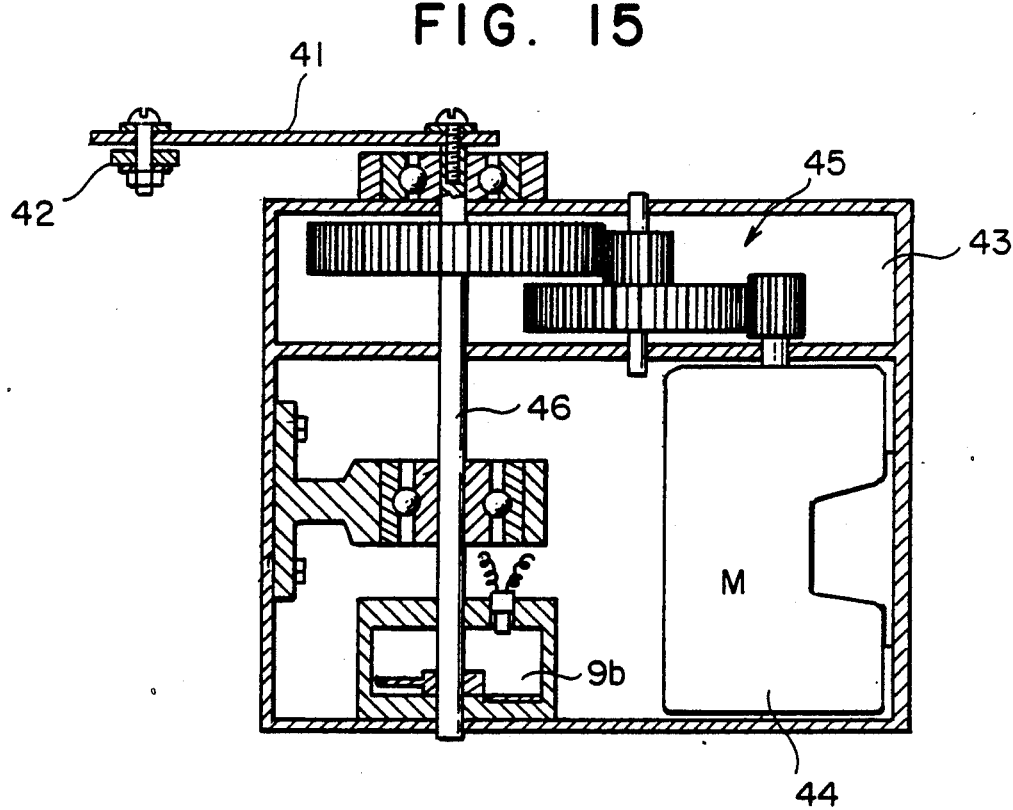
FIG. 15 is a sectional view of FIG. 14 showing an operation member thereof.

FIGS. 13 to 15 illustrates the third embodiment of the present invention. At least one headlight 1b includes the actuator 31a having a hole disposed in the end portion thereof, a pivotal driving rod 41 having a hole disposed in the end portion thereof, and a connecting rod 42 pivotally connected to the actuator 31a and the driving rod 41. The driving rod 41 is connected to a driving shaft 46 having a first gear geared with a second gear disposed within a driving unit 43. The second gear is connected to a motor 44. The driving shaft 46 contains a headlight angle detecting light sensor 9b.

In operation, when the steering wheel 14a is turned to right or left, the steering wheel angle detecting sensor 18a transmits a signal to the LSI 20a to make actuate the motor 44. When the motor 44 is rotated to make rotate the driving shaft 46. Therefore, the driving rod 41, the connecting rod 42, and the actuator 31a are actuated to make drive the headlight 1a to right or left. When the steering wheel 14a is released to return the standard position, the LSI 20a makes stop the motor 44. Thus at least one headlight 1a can brighten the forward road surface.

Figure 16:
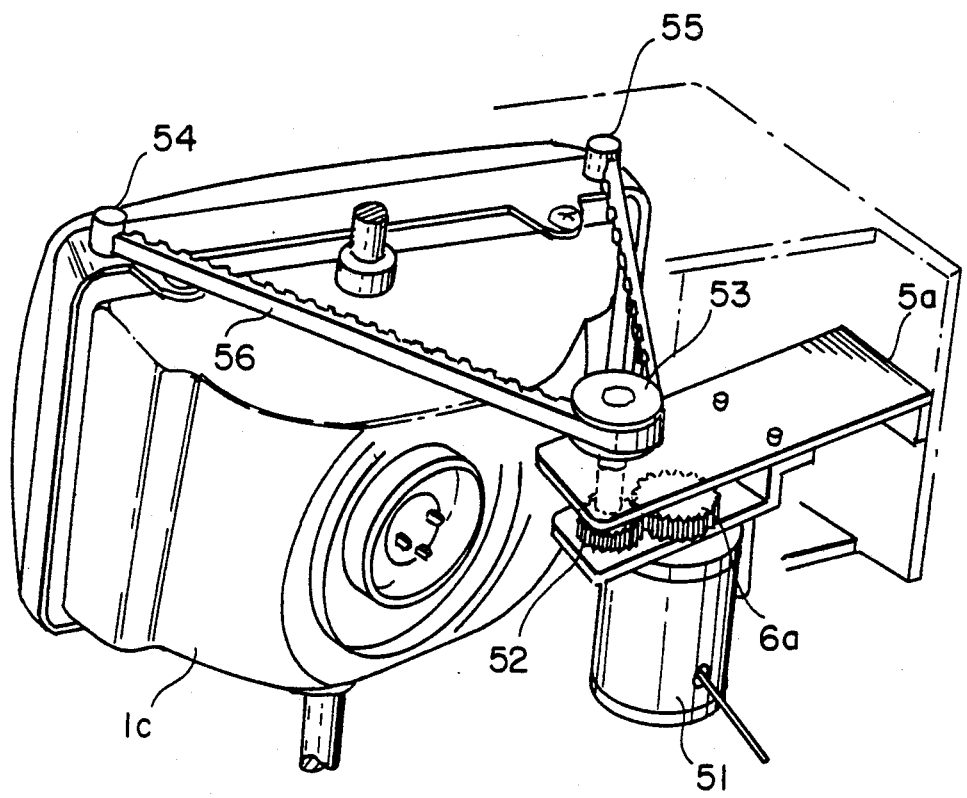
FIG. 16 is a perspective view of the fourth embodiment of the headlight moving apparatus of the present invention contains cut away portions in order to illustrate the basic construction thereof.
Figure 17:
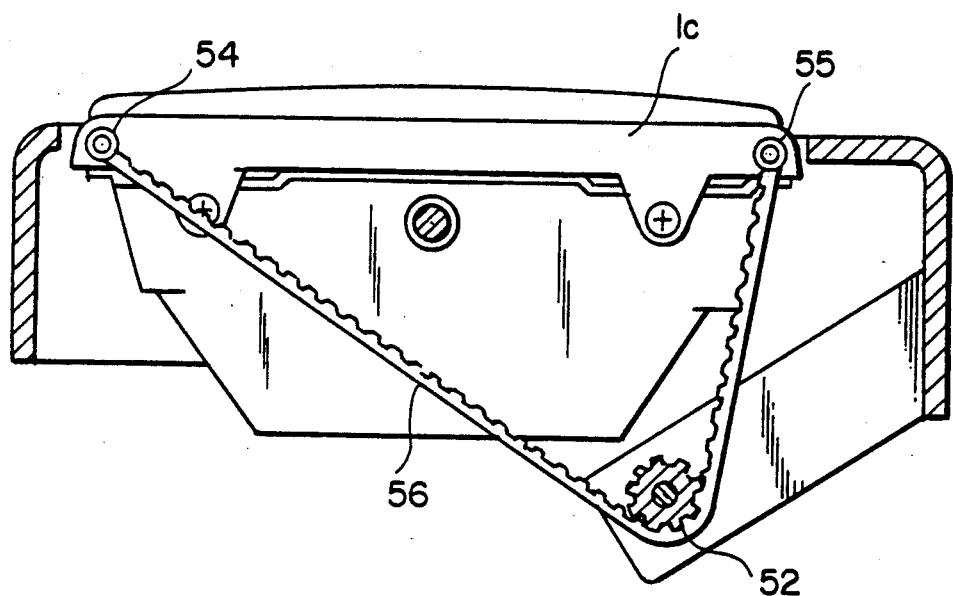
FIG. 17 is a cross-sectional view of FIG. 16 showing its operation.

FIGS. 16 and 17 shows the fourth embodiment of the present invention. At least one headlight 1c includes a motor 51 hung to the supporting plate 51. The motor 51 has a co-axial gear 6a geared with a gear 52. The gear 52 has a co-axial pulley 53. The pulley 53 is connected to both supports 54 and 55 supported on the top of the headlight 1c by a driving belt 56.

In operation, when the steering wheel 14a is turned to right or left, the LSI 20a makes to drive the motor 51 to right or left. At that time, the pulley 53 drives the driving belt 56 to right or left so that the headlight 1c rotates to right and left. Thus, at least one headlight 1c can brighten the forward road surface when the vehicle turns along the curved road.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A headlight moving apparatus for a motor vehicle provided with at least one rotatable headlight, said headlight moving apparatus comprising:
    a headlight casing,
    a headlight angle detecting sensor disposed in said headlight casing,
    a headlight actuating member operatively connected to said headlight angle detecting sensor and connected to said rotatable headlight, said headlight actuating member including:
        a mid-gear mounted to the rear portion of said at least one headlight through a pitch surface thereof,
        a motor gear coaxially provided with motor means, and
        a headlight sensor gear coaxially provided with said headlight angle detecting sensor, said mid-gear, said motor gear, and said sensor gear being disposed in gearing relationship with each other,
    a steering wheel,
    a steering wheel angle detecting sensor operatively associated with the headlight actuating member,
    a steering wheel actuating member operatively connected to said steering wheel angle detecting sensor and mounted to said steering wheel, said steering actuating member including:
        a steering wheel gear mounted to the low portion of a steering wheel shaft of said steering wheel, and
        a steering wheel sensor gear coaxially provided with said steering wheel angle detecting sensor, said steering wheel gear and said steering wheel sensor gear being disposed in gearing relationship with each other, and
    a connecting circuit operatively connected to said headlight angle detecting sensor, said steering wheel angle detecting sensor, and said motor means, whereby at least one headlight can brighten the forward road surface when the motor vehicle runs along a curved road.

2. The headlight moving apparatus of claim 1, wherein the headlight angle detecting sensor includes a circular plate, a ring-shaped rotatable, variable resistor disposed on said circular plate, a movable contacting point picked up on the surface of said variable resistor, and a mid-terminal disposed within said ring-shaped variable resistor.

3. The headlight moving apparatus of claim 1, wherein the motor means is a two-way motor.

4. The headlight moving apparatus of claim 1, wherein the connecting circuit includes an A/D converter connected to said headlight and steering wheel angle detecting sensors, a large scale integrator, a D/A convertor, and a plurality of transistors connected to said motor means.

* * * * *